United States Patent
Teruhi et al.

(10) Patent No.: US 11,115,941 B2
(45) Date of Patent: Sep. 7, 2021

(54) WIRELESS COMMUNICATION SYSTEM, WIRELESS TERMINAL, AND TIME SYNCHRONIZATION METHOD

(71) Applicant: NIPPON TELEGRAPH AND TELEPHONE CORPORATION, Tokyo (JP)

(72) Inventors: Shigeru Teruhi, Tokyo (JP); Mamoru Kobayashi, Yokosuka (JP); Kazunori Akabane, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/097,494

(22) PCT Filed: May 18, 2017

(86) PCT No.: PCT/JP2017/018678
§ 371 (c)(1),
(2) Date: Oct. 29, 2018

(87) PCT Pub. No.: WO2017/200043
PCT Pub. Date: Nov. 23, 2017

(65) Prior Publication Data
US 2019/0150106 A1 May 16, 2019

(30) Foreign Application Priority Data
May 18, 2016 (JP) .............................. JP2016-099714

(51) Int. Cl.
*H04W 56/00* (2009.01)
*G04R 20/26* (2013.01)
(Continued)

(52) U.S. Cl.
CPC ............ *H04W 56/001* (2013.01); *G04G 7/02* (2013.01); *G04R 20/02* (2013.01); *G04R 20/26* (2013.01);
(Continued)

(58) Field of Classification Search
CPC .................................................. H04W 56/001
See application file for complete search history.

(56) References Cited

U.S. PATENT DOCUMENTS

2004/0260985 A1* 12/2004 Krieger ................. H04J 3/0608
714/707
2005/0141543 A1* 6/2005 Nishimura ............ H04W 74/06
370/443
(Continued)

FOREIGN PATENT DOCUMENTS

JP    2006109433 A    4/2006
JP    2009-111654 A   5/2009
(Continued)

OTHER PUBLICATIONS

Japanese Office Action regarding JPSN 2018518354, dated Mar. 5, 2019.
(Continued)

Primary Examiner — John D Blanton

(57) ABSTRACT

A time synchronization system includes a first wireless device and a second wireless device. A wireless unit of the first wireless device wirelessly transmits timing information and time information separately, the time information being acquired from a first clock and relating to a transmission time when the timing information was transmitted. A wireless unit of the second wireless device receives the wirelessly transmitted timing information and time information separately. A correction unit of the second wireless device corrects s a second clock on the basis of a reference time indicated by the second clock at a time when the wireless
(Continued)

unit received the timing information, and a transmission time obtained from the time information.

13 Claims, 5 Drawing Sheets

(51) Int. Cl.
    *H04L 7/00*     (2006.01)
    *G04G 7/00*     (2006.01)
    *G04R 20/02*     (2013.01)
    *H04W 84/12*     (2009.01)

(52) U.S. Cl.
    CPC ........... *H04L 7/00* (2013.01); *H04W 56/0015* (2013.01); *H04W 84/12* (2013.01)

(56) References Cited

U.S. PATENT DOCUMENTS

2008/0273521 A1* 11/2008 Shao ................. H04W 56/0065
                                              370/350
2010/0150178 A1* 6/2010 Tamai .................. H04B 1/7085
                                              370/479
2017/0135053 A1* 5/2017 Shenoi ................ H04W 56/001
2017/0273039 A1* 9/2017 Adachi ................... H04L 69/28

FOREIGN PATENT DOCUMENTS

JP     2014-023090 A     2/2014
JP     2015-114290 A     6/2015

OTHER PUBLICATIONS

M. Morikura et al., 802.11 High-Speed Wireless LAN Textbook, Impress, Jan. 2005, pp. 103 to 106, with partial English translation attached.
International Search Report for PCT/JP2017/018678, ISA/JP, dated Aug. 15, 2017, with English translation attached.

* cited by examiner

WIRELESS COMMUNICATION SYSTEM, WIRELESS TERMINAL, AND TIME SYNCHRONIZATION METHOD

CROSS-REFERENCE TO RELATED APPLICATIONS

This application is a 371 U.S. National Stage of International Application No. PCT/JP2017/018678, filed May 18, 2017. Priority is claimed on Japanese Patent Application No. 2016-099714, filed May 18, 2016. The content of both applications is incorporated herein by reference.

TECHNICAL FIELD

The present invention relates to a wireless communication system, a wireless terminal, and a time synchronization method.

BACKGROUND ART

Between two devices or two modules, time information of one device or module may be transmitted to the other device or module, and a time held by the other device or module may be synchronized with a time held by the one device or module. For example, research on suppression of processing jitter through an interruption process in a real-time operation system (OS) has been conducted for synchronization between modules in built-in control. Furthermore, in a network time protocol (NTP), a device which has accessed a time server through a network sets a clock included therein to time information transmitted from the time server to synchronize time. In the NTP, research on suppression of variation in transmission caused by a relay mechanism in apparatuses (a router, a switch and the like) on a network has been conducted.

Wireless local area networks (LAN) have a function of time synchronization between a base station and a terminal, which is called a timing synchronization function (TSF). The base station notifies the terminal of a value of a clock included in the base station using a periodically transmitted beacon signal. The terminal which has received the beacon signal sets a clock thereof to the value of the clock set in the beacon signal (refer to Non-Patent Literature 1, for example).

CITATION LIST

Non-Patent Literature

[Non-Patent Literature 1]
Morikura Masahiro, et al., "802.11 High-Speed Wireless LAN Textbook," Impress, January 2005, pp. 103-106

SUMMARY OF INVENTION

Technical Problem

A built-in module based on a real-time OS has a unique hardware configuration and thus lacks versatility and is likely to be expensive. Accordingly, such a built-in module is not effective for terminals of sensor networks which require low costs and versatility.

Although the NTP can be provided for general devices connected to a network, the accuracy of time synchronization is merely tens of milliseconds approximately due to variation in processing time generated in processing between an application layer and a physical layer even if a one-way transmission delay is constant.

In wireless standards for communication including wireless LAN, autonomous waiting before transmission and automatic retransmission control frequently occur in the medium access control (MAC) layer, causing uncertainty in time with respect to communication. Accordingly, when a terminal which has received a signal including time information sets a clock to this time information, there is a likelihood of the clock value significantly deviating from a correct value.

An object of the present invention devised in view of the aforementioned circumstances is to provide a wireless communication system, a wireless terminal, and a time synchronization method which are capable of synchronizing clocks with high accuracy between devices which perform wireless communication therebetween.

Solution to Problem

A wireless communication system in a first aspect of the present invention includes a first wireless device and a second wireless device; the first wireless device includes: a first clock; and a wireless transmission unit configured to wirelessly transmit timing information and time information separately, the time information being acquired from the first clock and relating to a transmission time when the timing information was transmitted; and the second wireless device includes: a second clock; a wireless reception unit configured to receive the wirelessly transmitted timing information and time information separately; and a correction unit configured to correct the second clock on the basis of a reference time indicated by the second clock at a time when the wireless reception unit received the timing information, and the transmission time acquired from the time information.

According to a second aspect of the present invention, in the wireless communication system of the first aspect, the correction unit determines a time when the wireless reception unit detected synchronization of a radio frame relating to the timing information as a time when the timing information was received.

According to a third aspect of the present invention, in the wireless communication system of the second aspect, the correction unit corrects the second clock on the basis of the reference time, the transmission time and a transmission period of the timing information.

According to a fourth aspect of the present invention, in the wireless communication system of any one of the first, second and third aspects, the second wireless device further comprises a recording unit configured to record history information about correction of the time of the second clock, and the correction unit calculates a trend in deviation in the time of the second clock on the basis of the history information and corrects a deviation in the time of the second clock in an elapsed time on the basis of the calculated trend and the elapsed time from reception of the timing information to reception of the time information.

According to a fifth aspect of the present invention, in the wireless communication system of the fourth aspect, the history information includes information on a time when correction of the time of the second clock was performed, and the correction unit corrects the deviation in the time of the second clock in the elapsed time on the basis of a period from previous correction of the second clock to the next correction of the second clock and the elapsed time from reception of the timing information to reception of the time information.

According to a sixth aspect of the present invention, in the wireless communication system of the fourth aspect, the history information includes information on a time when time correction of the second clock was performed and a correction quantity of the second clock at the time; and the correction unit calculates a deviation of the second clock in a certain time on the basis of a period from a time correction to a next time correction and the correction quantity and corrects a deviation in the time of the second clock in the elapsed time on the basis of the calculated deviation in the certain time and the elapsed time from reception of the tuning information to reception of the time information.

A wireless terminal in a seventh aspect of the present invention is a wireless terminal in a wireless communication system including a wireless base station and the wireless terminal, and the wireless terminal includes: a wireless reception unit configured to separately receive timing information transmitted from the wireless base station and time information about a transmission time indicated by a first clock included in the wireless base station at a time when the timing information was transmitted; a second clock; and a correction unit configured to correct the second clock on the basis of a reference time indicated by the second clock at a time when the wireless reception unit received the timing information, and the transmission time acquired from the time information.

A time synchronization method in an eighth aspect of the present invention is executed by a wireless communication system including a first wireless device and a second wireless device, and the time synchronization method includes: a transmission step in which the first wireless device wirelessly transmits timing information and time information separately, the time information being acquired from a first clock included in the first wireless device and relating to a transmission time when the timing information was transmitted; a reception step in which the second wireless device receives the wirelessly transmitted timing information and time information separately; and a correction step in which the second wireless device corrects the second clock on the basis of a reference time indicated by the second clock included in the second wireless device at a time when the timing information was received, and the transmission time acquired from the time information.

According to a ninth aspect of the present invention, in the time synchronization method of the eighth aspect, a time when synchronization of a radio frame relating to the timing information was detected is determined as a time when the timing information was received in the correction step.

According to a tenth aspect of the present invention, in the time synchronization method of the ninth aspect, the second wireless device corrects the second clock on the basis of the reference time, the transmission time and a transmission period of the timing information in the correction step.

According to an eleventh aspect of the present invention, the time synchronization method of any one of the eighth, ninth and tenth aspects further includes a recording step in which the second wireless device records history information about correction of the time of the second clock, wherein a trend in a deviation in the time of the second clock is calculated on the basis of the history information, and wherein the deviation in the time of the second clock in an elapsed time is further corrected on the basis of the calculated trend and the elapsed time from reception of the timing information to reception of the time information in the correction step.

According to a twelfth aspect of the present invention, in the time synchronization method of the eleventh aspect, the history information includes information on a time when correction of the time of the second clock was performed, and wherein, in the correction step, the deviation in the time of the second clock in the elapsed time is corrected on the basis of a period from a previous correction of the second clock to the next correction of the second clock, and the elapsed time from reception of the timing information to reception of the time information.

According to a thirteenth aspect of the present invention, in the time synchronization method of the eleventh aspect, the history information includes information on a time when time correction of the second clock was performed and a correction quantity of the second clock at the time, and wherein, in the correction step, a deviation of the second clock in a certain period of time is calculated on the basis of a period from a time correction to the next time correction and the correction quantity, and wherein the deviation in the time of the second clock in the elapsed time is corrected on the basis of the calculated deviation in the certain period of time, and the elapsed time from reception of the timing information to reception of the time information.

Advantageous Effects of Invention

According to the present invention, it is possible to synchronize clocks with high accuracy between devices which perform wireless communication therebetween.

DESCRIPTION OF EMBODIMENTS

Hereinafter, embodiments of the present invention will be described in detail with reference to the drawings.

First Embodiment

Figure 1:
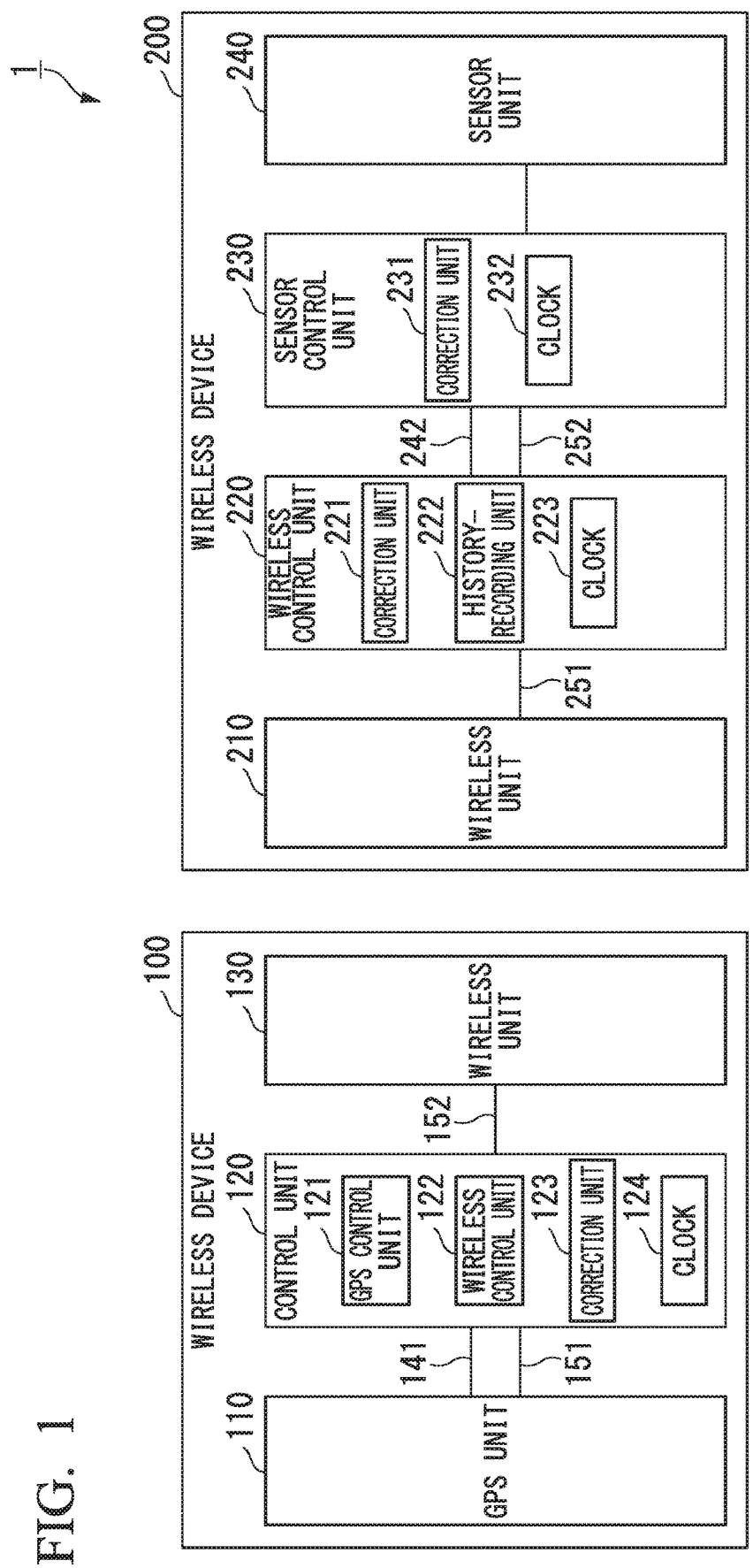
FIG. 1 is a diagram showing a configuration of a wireless communication system according to a first embodiment of the present invention.

FIG. 1 is a diagram showing a configuration of a time synchronization system 1 according to a first embodiment. The time synchronization system 1 shown in the figure includes a wireless device 100 (first wireless device, wireless base station) and a wireless device 200 (second wireless device, wireless terminal). The time synchronization system 1 is included in a wireless communication system including a plurality of wireless devices.

The wireless device 100 includes a global positioning system (GPS) unit 110, a control unit 120 and a wireless unit 130 (wireless transmitter). The GPS unit 110 and the control unit 120 are connected through a pulse line 141 and a serial line 151. The control unit 120 and the wireless unit 130 are connected through a serial line 152.

The GPS unit 110 is a GPS module equipped with a GPS. The GPS unit 110 receives information on a time of a GPS satellite. The control unit 120 is a control module composed of a central processing unit (CPU) and various memories, for example. The control unit 120 performs control of each unit and various operations. The control unit 120 includes a GPS control unit 121, a wireless control unit 122, a correction unit 123, and a clock 124 (first clock). The GPS control unit 121 controls the GPS unit 110. The wireless control unit 122 controls the wireless unit 130. The correction unit 123 performs time correction of the clock 124. The wireless unit 130 is a wireless module and transmits and receives radio frequency (RF) signals.

Further, the wireless device 100 may include a clock 124 outside the control unit 120.

The wireless device 200 includes a wireless unit 210 (wireless receiver), a wireless control unit 220, a sensor control unit 230, and a sensor unit 240. The wireless unit 210 and the wireless control unit 220 are connected through a serial line 251. The wireless control unit 220 and the sensor control unit 230 are connected through a pulse line 242 and a serial line 252.

The wireless unit 210 is a wireless module and transmits and receives RF signals. The wireless control unit 220 is a module which controls the wireless unit 210 and is composed of a CPU and various memories, for example. The wireless control unit 220 includes a correction unit 221, a history-recording unit 222 and a clock 223 (second clock). The correction unit 221 performs time correction of the clock 223. The history-recording unit 222 records history information about time correction of the clock 223.

The sensor control unit 230 is a module which controls the sensor unit 240. The sensor control unit 230 includes a correction unit 231 and a clock 232. The correction unit 231 performs time correction of the clock 232. The sensor unit 240 is a sensor module including any sensor.

Further, the wireless device 200 may include a clock 223 outside the wireless control unit 220.

In addition, the wireless device 200 may include the sensor unit 240 or the sensor control unit 230 and a sensor unit 240 outside the wireless device 200. Further, the sensor control unit 230 and the sensor unit 240 may be included in one sensor module.

Figure 2:
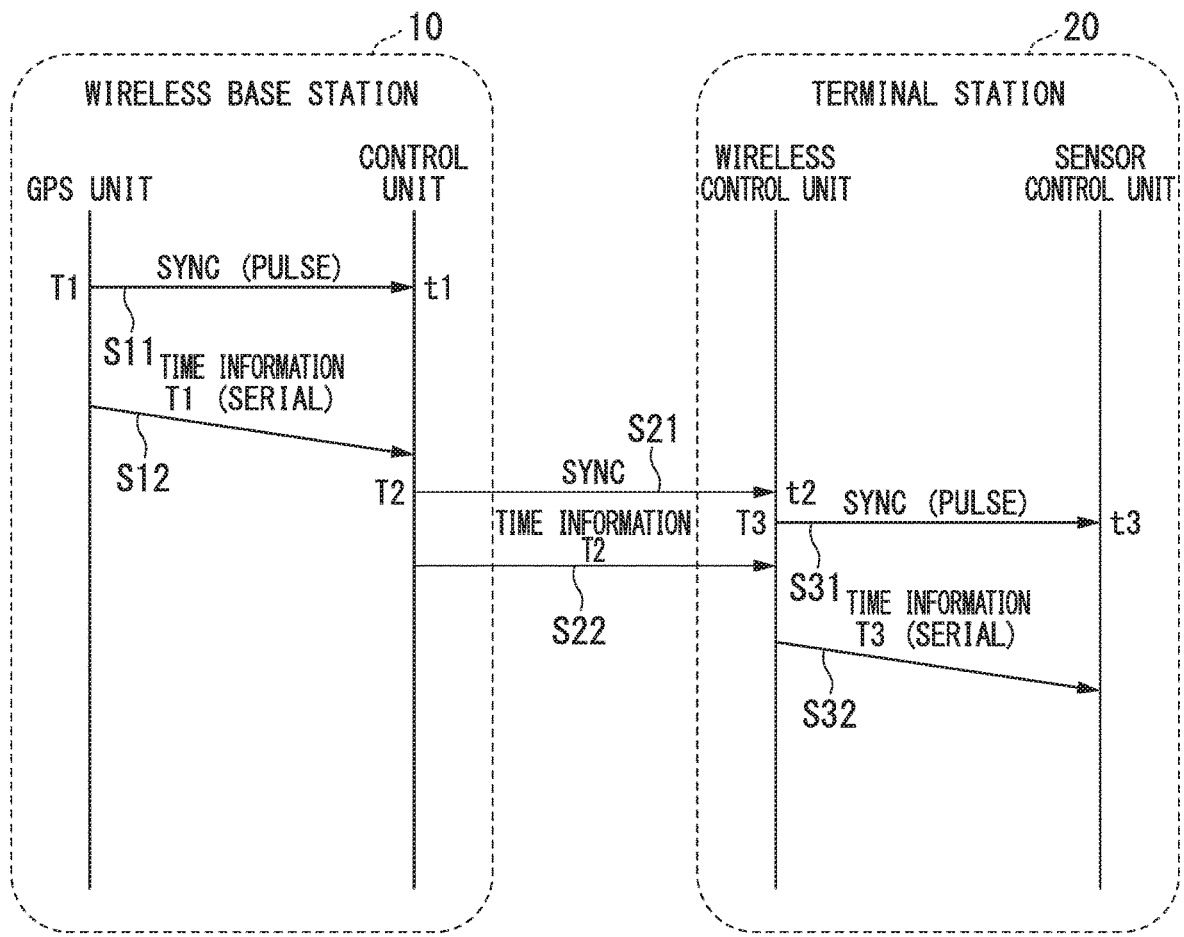
FIG. 2 is a sequence diagram of time synchronization in the wireless communication system according to the first embodiment.

FIG. 2 is a sequence diagram of time synchronization in the time synchronization system 1. The figure illustrates an example in which the wireless device 100 is a wireless base station 10 and the wireless device 200 is a terminal station 20. The wireless base station 10 broadcasts time information to one or more terminal stations 20 through a wireless line to promote time synchronization between the wireless base station 10 and the terminal station 20.

Time synchronization between modules in the wireless base station 10 will be described using FIG. 2.

When the control unit 120 of the wireless base station 10 acquires received time information of a GPS satellite from the GPS unit 110 through the serial line 151, variation in time is generated when the time information is acquired according to a load on the control unit 120 and thus the time information may not be acquired with accuracy. Accordingly, the wireless base station 10 includes the pulse line 141 and the serial line 151 provided between the GPS unit 110 and the control unit 120, and the GPS unit 110 transmits timing information to the control unit 120 using the pulse line 141. Specifically, the GPS unit 110 transmits a SYNC (pulse) as timing information through the pulse line 141 prior to time information (step S11). A pulse per second (PPS) signal output per second from the GPS unit 110 may be used as the timing information.

The control unit 120 immediately receives the timing information according to interruption. The correction unit 123 of the control unit 120 refers to and records a time t1 (referred to as "reference time" hereinafter) of the clock 124 included in the control unit 120 when the timing information is received. Further, the GPS unit 110 also refers to and records a time T1 of the GPS satellite when the timing information is transmitted through the SYNC (pulse). In addition, the GPS unit 110 transmits time information T1 which is information about the time T1 received from the GPS satellite through the serial line (step S12). That is, the time information T1 is information by which the time T1 can be acquired.

The control unit 120 receives the time information T1 through the serial line 151. The correction unit 123 of the control unit 120 acquires the time T1 of the GPS satellite from the time information T1. The correction unit 123 corrects the clock 124 included in the module thereof on the basis of the recorded reference time t1 and the time T1 acquired from the time information T1. Specifically, the correction unit 123 corrects the time of the clock 124 such that the time of the clock 124 becomes a time from which a correction quantity has been subtracted using a difference (t1−T1) between the reference time t1 and the time T1 as the correction quantity. The correction unit 123 may measure an elapsed time from when the control unit 120 receives the timing information to when the time information about the time of the GPS satellite is received and correct the time of the clock 124 in consideration of the elapsed time. The correction unit 123 performs time correction in consideration of the elapsed time through the same process as a process illustrated in FIG. 3 or FIG. 4 which will be described later. In this case, the control unit 120 is provided with a history-recording unit which records history information about time correction of the clock 124.

Time synchronization between the wireless base station 10 and the terminal station 20 will be described using FIG. 2.

The wireless unit 130 of the wireless base station 10 transmits a signal in a fixed format as timing information through a wireless line. When random access control or retransmission control such as carrier sense multiple access with collision avoidance (CSMA/CA) is involved, the control unit 120 of the wireless base station 10 is not able to control an actual transmission timing. Accordingly, a delay occurring in random access control or retransmission control is caused before the terminal station 20 receives the timing information, and thus the terminal station 20 is not able to acquire the timing information at a correct time. Hence, timing information and time information are separately transmitted between the wireless base station 10 and the terminal station 20.

Specifically, the wireless unit 130 of the wireless base station 10 wirelessly transmits a SYNC as timing information in advance (step S21). It is desirable that the timing information have a high transmission priority. In addition, it is desirable to set the timing information to a frame having a short frame length in order to decrease a time necessary for a reception operation in the wireless unit 210 of the terminal station 20 as much as possible.

The wireless unit 210 of the terminal station 20 wirelessly receives the timing information from the wireless base station 10. A time taken from when the wireless unit 130 of the wireless base station 10 transmits an RF signal to when the wireless unit 210 of the terminal station 20 receives the RF signal is sufficiently shorter than a delay according to control such as CSMA/CA. The wireless unit 210 immediately outputs the timing information to the wireless control unit 220 according to interruption when the timing information is received. The correction unit 221 of the wireless control unit 220 immediately receives the timing information according to interruption and refers to and records a reference time t2 which is a time indicated by the clock 223 at that time. Further, the correction unit 123 of the wireless base station 10 also refers to and records a time T2 of the clock 124 included therein when the wireless unit 130 transmits the timing information. That is, the time T2 is the time at which the wireless base station 10 transmits the timing information. The reference time t2 is the time at which the terminal station 20 receives the timing information.

The correction unit 123 of the wireless base station 10 transmits time information T2 which is information about the time T2 of the clock 124 to the wireless unit 130 using the serial line 152. The time information T2 is information from which the time T2 can be acquired. The wireless unit 130 wirelessly transmits the time information T2 (step S22).

In the terminal station 20, the correction unit 221 of the wireless control unit 220 acquires the time T2 of the clock 124 of the wireless base station 10 from the received time information T2. The correction unit 221 corrects the clock 223 on the basis of the recorded reference time t2 and the time T2 acquired from the time information T2. Specifically, the correction unit 221 corrects the time of the clock 223 such that the time of the clock 223 becomes a time from which a correction quantity has been subtracted using a difference (t2−T2) obtained by subtracting the time T2 from the reference time t2 as the correction quantity.

In addition, the correction unit 221 may measure an elapsed time Δt from when the terminal station 20 receives the timing information to when the time information, which is information about the time of the clock 124 of the wireless base station 10, is received and also take the elapsed time Δt into account when the time of the clock 223 is corrected. Time correction taking the elapsed time Δt into account will be described using FIG. 3.

Figure 3:
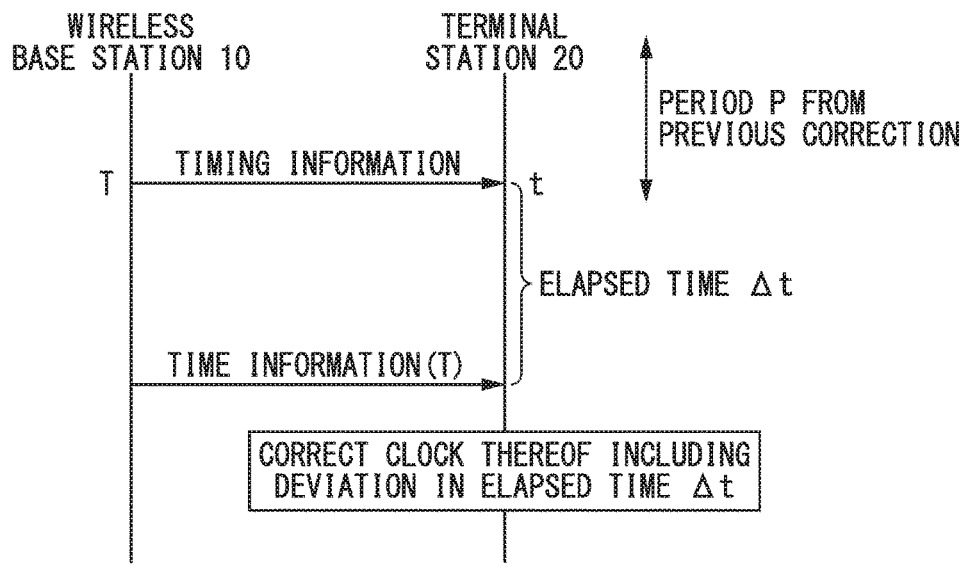
FIG. 3 is a diagram showing an example of fine adjustment of time correction according to the first embodiment.

FIG. 3 is a diagram showing an example of fine adjustment of time correction. The figure illustrates an example of finely adjusting a deviation generated between a timing information arrival time and a time information arrival time.

A time of the clock 124 at which the wireless base station 10 transmits the timing information is regarded as T, a reference time of the clock 223 at which the terminal station 20 receives the timing information is regarded as t, and time information in which the time T is set is regarded as time information (T). The history-recording unit 222 records, as history information, a time at which the correction unit 221 has performed previous time correction of the clock 223. The correction unit 221 estimates a deviation of the clock 223 in the elapsed time Δt on the basis of a period P from the time at which the previous time correction of the clock 223 is performed to the reference time t at which the timing information is received, and the elapsed time Δt. The deviation is estimated as (t−T)×Δt/P, for example. The correction unit 221 corrects the time of the clock 223 including the deviation. That is, the correction unit 221 corrects the time of the clock 223 such that the time of the clock 223 becomes a time from which a correction quantity has been subtracted using (t−T)×(1+Δt/P) as the correction quantity.

Figure 4:
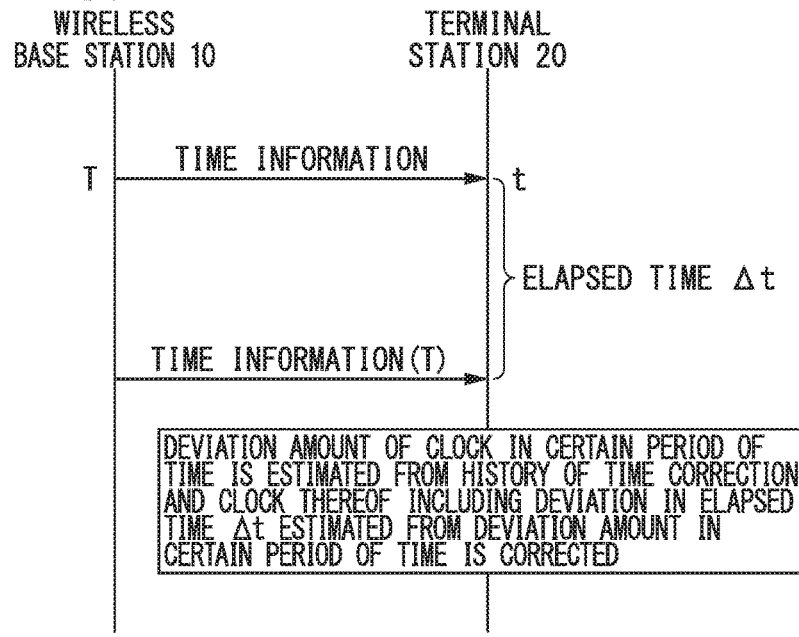
FIG. 4 is a diagram showing an example of fine adjustment of time correction according to the first embodiment.

FIG. 4 is a diagram showing another example of fine adjustment of time correction. The figure illustrates an example of fine adjustment of time correction on the basis of history of time correction so far.

The history-recording unit 222 of the terminal station 20 correlates a time at which the correction unit 221 performs time correction of the clock 223 with a correction quantity of the clock 223 in the time correction and records the correlated time and correction quantity whenever time correction is performed. The time at which the correction unit 221 corrects the time of the clock 223 is a time after correction. The correction unit 221 estimates a deviation quantity M of the clock 223 in a certain period on the basis of the time and the correction quantity through a statistical method such as weighted averaging. The correction unit 221 estimates a deviation (e.g., M×Δt) of the clock 223 in the elapsed time Δt on the basis of the estimated deviation quantity M and the elapsed time Δt and adds the deviation to a correction when correction is performed.

Specifically, the history-recording unit 222 correlates a time $T_n$ acquired from time information when the correction unit 221 has performed an n-th (n=1, 2, ...) time correction with a correction quantity $(t_n−T_n)+M_n×Δt_n$ of the clock 223 and records the correlated time and correction quantity. $t_n$ is a reference time at the time of the n-th time correction. In addition, $M_n$ is a deviation quantity of the clock 223 in a certain period at the time of the n-th time correction. $Δt_n$ is an elapsed time Δt from when the terminal station 20 receives the timing information to when the terminal station 20 receives the time information at the time of the n-th time correction. In this case, the deviation quantity M of the clock 223 in the certain period is calculated as $M_N$ represented by Equation (1) using information when the previous N time corrections (N being an integer equal to or greater than 2) have been performed. The correction unit 221 corrects the time of the clock 223 such that the time of the clock 223 becomes a time from which a correction quantity has been subtracted using (t−T)+M×Δt as the correction quantity.

$$M_N = \frac{1}{N}\sum_{n=1}^{N}\frac{(t_n - T_n) + M_n \times \Delta t_n}{T_n - T_{n-1}} \quad (1)$$

Time synchronization between modules in the terminal station 20 will be described using FIG. 2. In the terminal station 20, the wireless control unit 220 for controlling the wireless unit 210 and the clock 223 are provided separately from the sensor control unit 230 for controlling the sensor unit 240 and the clock 232. In this manner, a module for controlling a wireless unit and a clock may be provided separately from a module for controlling a sensor and the like and a clock in a terminal station. In such a case, it is necessary to promote time synchronization between the wireless control unit 220 for controlling the wireless unit 210 and the sensor control unit 230 for controlling the sensor unit 240. When the sensor control unit 230 acquires the time of the clock 223 included in the wireless control unit 220 from the wireless control unit 220 through the serial line 252, variation in time is generated when the time is acquired according to a load on the sensor control unit 230 and thus the time may not be acquired with accuracy. Accordingly, the pulse line 242 and the serial line 252 are provided between the wireless control unit 220 and the sensor control unit 230 such that the wireless control unit 220 transmits timing information to the sensor control unit 230 using the pulse line 242. Specifically, the correction unit 221 of the wireless control unit 220 transmits timing information to the sensor control unit 230 through the pulse line 242 prior to time information (step S31).

The sensor control unit 230 immediately receives the timing information according to interruption. The correction unit 231 of the sensor control unit 230 refers to and records the time t3 (hereinafter referred to as "reference time") of the clock 232 included in the sensor control unit 230 when the timing information is received. Further, the correction unit 221 of the wireless control unit 220 also refers to and records a time T3 of the clock 223 included in the wireless control unit 220 when the timing information is transmitted. In addition, the correction unit 221 of the wireless control unit 220 transmits information about T3 to the sensor control unit 230 through the serial line 252 at the time of the clock 223 (step S32).

The sensor control unit 230 receives the time information T3 through the serial line 252. The correction unit 231 of the sensor control unit 230 acquires the time T3 indicated by the clock 223 included in the wireless control unit 220 from the time information T3. The correction unit 231 corrects the clock 232 included in the module thereof on the basis of the recorded reference time t3 and the time T3 acquired from the time information T3. Specifically, the correction unit 231 corrects the time of the clock 232 such that the time indicated by the clock 232 becomes a time from which a correction quantity has been subtracted using a difference (t3−T3) between the reference time t3 and the time T3 as the correction quantity. The correction unit 231 may measure an elapsed time from when the sensor control unit 230 receives the timing information to when the time information about the time of the clock 223 included in the wireless control unit 220 is received and perform time correction of the clock 232 in consideration of the elapsed time. The correction unit 231 performs the time correction considering the elapsed time through the same process as the process illustrated in FIG. 3 or FIG. 4. In this case, the history-recording unit which records history information about time correction of the clock 232 is provided in the sensor control unit 230.

Although a case in which the wireless base station 10 broadcasts timing information and time information has been described above, timing information and time information may be transmitted to a specific terminal station 20.

According to the present embodiment, for synchronization of the clocks between the wireless device 100 and the wireless device 200, the wireless unit 130 of the wireless device 100 wirelessly transmits timing information and time information separately. The time information relates to a transmission time acquired from the clock 124 of the wireless device 100 at a time when the timing information is transmitted. The wireless unit 210 of the wireless device 200 separately receives the wirelessly transmitted timing information and the time information. The correction unit 221 of the wireless device 200 corrects the time of the clock 223 on the basis of the reference time which is the time of the clock 223 of the wireless device 200 at which the timing information is received, and the transmission time acquired from the time information.

Since the history-recording unit 222 of the wireless device 200 records history information about time correction of the clock 223, the correction unit 221 may further correct a deviation in the time of the clock 223 in an elapsed time from reception of the timing information to reception of the time information on the basis of a trend in deviation in the time of the clock 223 calculated on the basis of the history information, and the elapsed time.

For example, the correction unit 221 may correct a deviation in the time of the clock 223 in the elapsed time on the basis of a period from a previous time correction of the clock 223 to the next time correction and the elapsed time from reception of the timing information to reception of the time information.

In addition, the correction unit 221 acquires information on a period from a time correction to the next time correction and a correction quantity from the history information and calculates a deviation of the clock 223 in a certain period of time on the basis of the acquired information, for example. The correction unit 221 corrects a deviation in the time of the clock 223 in the elapsed time on the basis of the calculated deviation in the certain period of time and the elapsed time from reception of the timing information to reception of the time information.

Accordingly, it is possible to synchronize the clocks between the wireless device 100 and the wireless device 200 with high accuracy at low cost.

Second Embodiment

A time synchronization system of the present embodiment broadcasts time information from a wireless base station to a terminal station through a wireless line to promote time synchronization between the wireless base station and the wireless terminal station in the same way as in the first embodiment. However, the synchronization system of the present embodiment transmits time information indicating a transmission time of timing information prior to the timing information when time synchronization between modules is performed. Hereinafter, a description will be performed focusing on differences from the first embodiment.

The time synchronization system of the present embodiment has the same components as those of the time synchronization system 1 of the first embodiment shown in FIG. 1. That is, the wireless device 100 is equipped with the GPS module and is able to receive a time of a GPS satellite.

Figure 5:
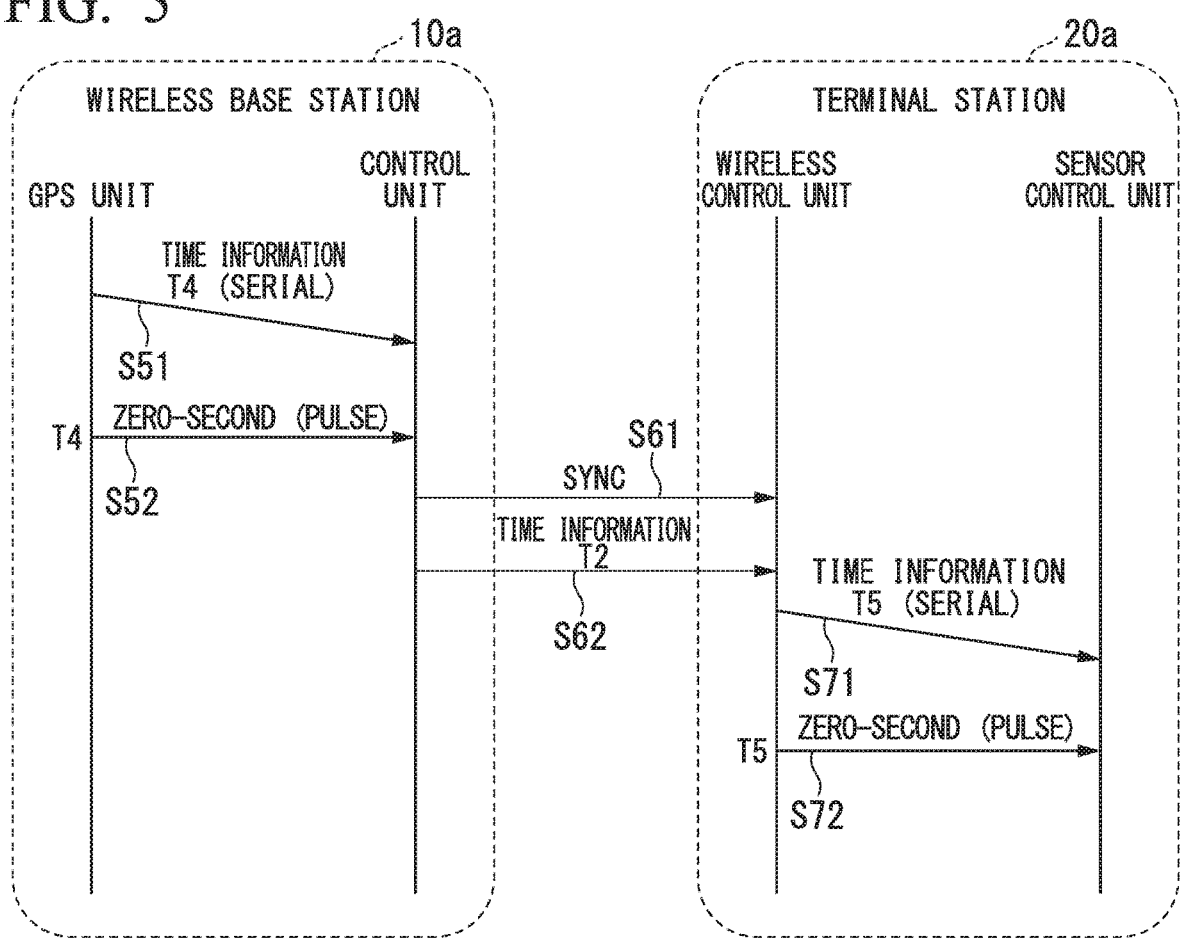
FIG. 5 is a sequence diagram of time synchronization in a wireless communication system according to a second embodiment.

FIG. 5 is a sequence diagram showing an operation of the time synchronization system of the present embodiment. The figure illustrates an example of a case in which the wireless device 100 is a wireless base station 10a and the wireless device 200 is a terminal station 20a. Time synchronization between the wireless base station 10a and the terminal station 20a is the same as time synchronization between the wireless base station 10 and the terminal station 20 in the first embodiment, and thus description thereof is omitted.

Time synchronization between modules in the wireless base station 10a will be described using FIG. 5. The wireless base station 10a includes the pulse line 141 and the serial line 151 provided between the GPS unit 110 and the control unit 120 in the same way as in the wireless base station 10 of the first embodiment. The GPS unit 110 transmits timing information to the control unit 120 through the pulse line. However, the GPS unit 110 previously transmits time information T4 which is information about a time T4 of a GPS satellite prior to the time T4 using the serial line 151, distinguished from the first embodiment (step S51). However, the information about the time of the GPS satellite may not include information in a unit equal to or less than a variation in time generated when the time information is transmitted through the serial line 151. When the time information T4 is received from the GPS unit 110, the correction unit 123 of the control unit 120 acquires the time T4 of the GPS satellite from the time information T4 and records the time T4.

In addition, the GPS unit 110 transmits timing information using the pulse line 141 at a timing of a zero-second related to the time T4 of the GPS satellite (step S52). The control unit 120 immediately receives the timing information according to interruption. The correction unit 123 of the control unit 120 corrects the clock 124 included in the module thereof on the basis of reception of the previously acquired information about the time T4 of the GPS satellite and the timing information relating to the time T4. That is, the correction unit 123 recognizes the timing at which the timing information is received as a timing such as the zero-second relating to the time T4 of the GPS satellite previously received in step S51 to correct the clock 124. Accordingly, the GPS unit 110 and the control unit 120 need to share the information representing that the transmission timing of the timing information is a timing of a zero-second related to the time of the GPS satellite in advance. However, it is not necessary that the GPS unit 110 records the transmission time of the timing information and the control unit 120 records the reception time of the timing information and the reception time of the time information with reference to the clock 124 included in the module thereof in the same way as in the first embodiment.

The sequence of time synchronization between the wireless base station 10a and the terminal station 20a in steps S61 and S62 shown in FIG. 5 is the same as the sequence of time synchronization between the wireless base station 10 and the terminal station 20 in steps S21 and S22 of the first embodiment shown in FIG. 2.

Time synchronization between modules in the terminal station 20a will be described using FIG. 5. The terminal station 20a includes the pulse line 242 and the serial line 252 provided between the wireless control unit 220 and the sensor control unit 230 in the same way as in the terminal station 20 of the first embodiment. The correction unit 221 of the wireless control unit 220 transmits tuning information to the sensor control unit 230 using the pulse line 242. However, the correction unit 221 of the wireless control unit 220 previously transmits time information T5 which is information about a time T5 of the clock 223 included in the module thereof prior to the timing information using the serial line 252, distinguished from the first embodiment (step S71). However, the information about the time of the clock 223 may not include information in a unit equal to or less than variation in time generated when the time information is transmitted through the serial line 252. When the time information T5 is received, the correction unit 231 of the sensor control unit 230 acquires the time T5 from the time information T5 and records the time T5.

The correction unit 221 of the wireless control unit 220 transmits the timing information to the sensor control unit 230 using the pulse line 242 at a timing of a zero-second related to the time T5 of the clock 223 (step S72). The sensor control unit 230 immediately receives the timing information according to interruption. The correction unit 231 of the sensor control unit 230 corrects the clock 232 included in the module thereof on the basis of reception of previous information about the time T5 of the clock 223 included in the wireless control unit 220 and the timing information relating to the time T5. That is, the correction unit 231 recognizes the timing at which the timing information is received as a timing of the zero-second related to the time T5 of the clock 223 included in the wireless control unit 220 previously received in step S71 to correct the clock 233 included in the module thereof. Accordingly, the wireless control unit 220 and the sensor control unit 230 need to share information representing that the transmission timing of the timing information is a timing of a zero-second related to the time of the clock 223 included in the wireless control unit 220 in advance. However, in the second embodiment, it is not necessary that the wireless control unit 220 records the transmission time of the timing information and the sensor control unit 230 records the reception time of the timing information and the reception time of the time information with reference to the clock 232 included in the module thereof in the same way as in the first embodiment.

Third Embodiment

A time synchronization system according to a third embodiment is included in a wireless communication system in the same way as in the first and second embodiments. The time synchronization system broadcasts time information from a wireless base station to a terminal station through a wireless line to promote time synchronization between the wireless base station and the terminal station. The wireless base station includes a GPS unit which acquires a time and a PPS signal from a signal received from a GPS satellite. In the third embodiment, the wireless base station also promotes synchronization between a clock thereof and a clock of the terminal station using an accurate time acquired by the GPS unit in the same way as in the first and second embodiments. The wireless base station in the third embodiment includes the same components as those included in the wireless device 100 described in the first embodiment. The terminal station in the third embodiment includes the same components as those included in the wireless device 200 described in the first embodiment.

Time synchronization between the GPS unit 110 and the control unit 120 in the wireless base station is the same as time synchronization in the first or second embodiment. Time synchronization between the wireless control unit 220 and the sensor control unit 230 in the terminal station is also the same as time synchronization in the first or second embodiment. Hereinafter, time synchronization between the wireless base station and the terminal station will be described.

The wireless base station transmits a signal having a predetermined format as timing information (SYNC) through a wireless line. The frame length of a radio frame used to transmit the timing information is fixed. In the format of the timing information, a preamble pattern disposed at the head of a radio frame is followed by a synchronization code word indicating that the signal included in the radio frame is the timing information. The synchronization code word is a predetermined signal pattern. When the terminal station receives a signal including the synchronization code word, the terminal station is able to detect the synchronization code word without demodulating and decoding the received signal. The synchronization code word may be disposed at the head of the radio frame as a preamble pattern.

When random access control or retransmission control using CSMA/CA or the like are performed, it is difficult for a base station device to control a transmission timing at which timing information is transmitted. A delay caused by random access control or retransmission control is included in a time from when the base station device initiates a process of transmitting the timing information to when a terminal station finishes a process of receiving the timing information. Accordingly, it is difficult for the base station device to transmit the timing information at a predetermined timing and for the terminal station device to receive the timing information at that timing.

The time synchronization system of the third embodiment performs time synchronization in such a manner that a wireless base station separately transmits timing information and time information and a terminal station reduces the influence of delay in the same way as in the time synchronization system 1 of the first embodiment.

Figure 6:
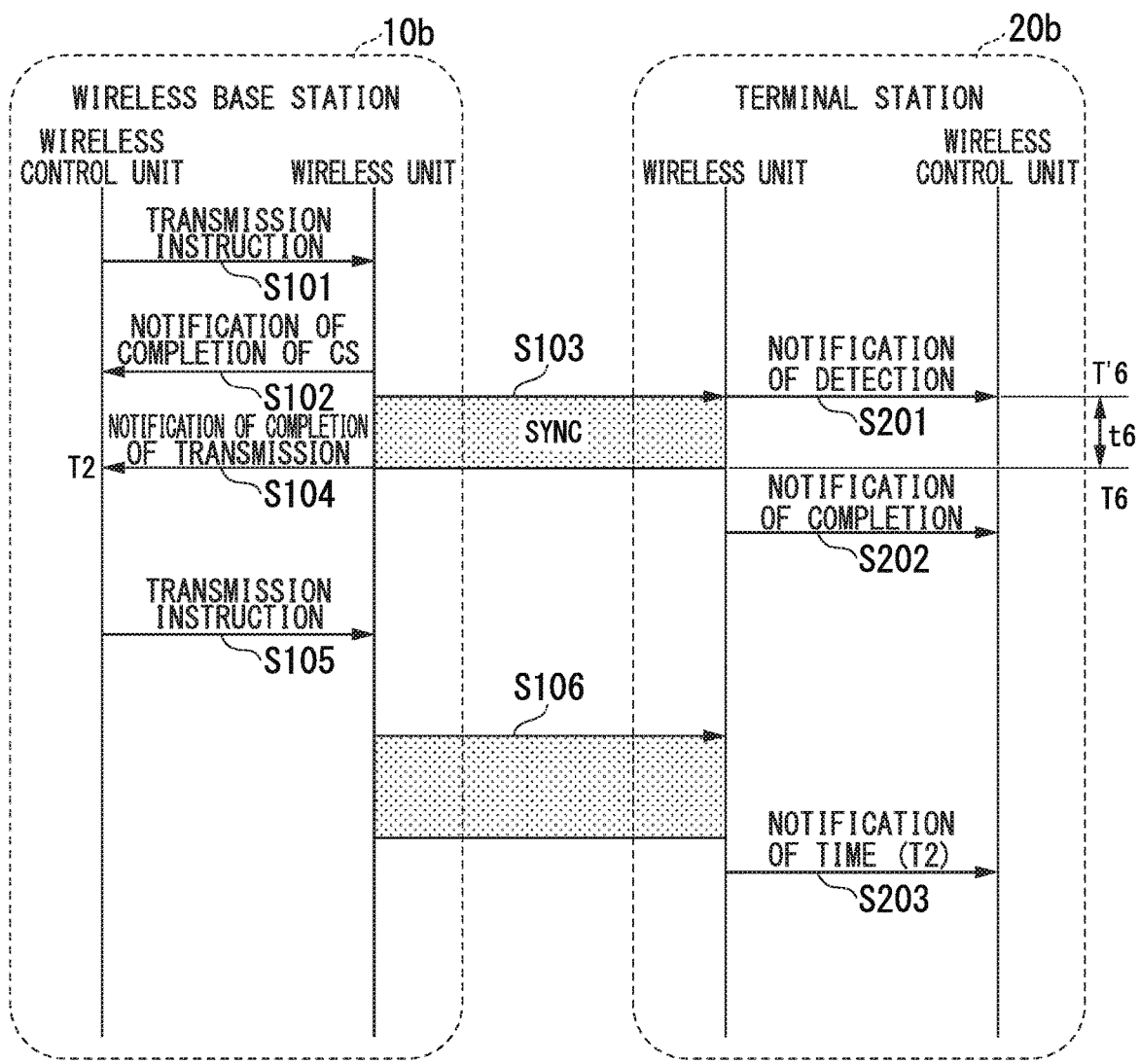
FIG. 6 is a sequence diagram showing an operation of a time synchronization system of a third embodiment.

FIG. 6 is a sequence diagram showing an operation of the time synchronization system of the third embodiment. The figure illustrates a case in which the wireless device 100 is a wireless base station 10b and the wireless device 200 is a terminal station 20b.

The operation of the wireless base station 10b in a time synchronization method of the third embodiment will be described with reference to FIG. 6. When a time synchronization operation is initiated in the wireless base station 10b, the wireless control unit 122 instructs the wireless unit 130 to transmit timing information (step S101). The wireless unit 130 performs carrier sensing (CS) in order to acquire a transmission right. When the wireless unit 130 acquires the transmission right, the wireless unit 130 notifies the wireless control unit 122 that carrier sensing is completed (step S102) and starts transmission of the timing information (SYNC) (step S103).

When transmission of the timing information is finished, the wireless unit 130 notifies the wireless control unit 122 that transmission of the timing information is completed (step S104). When the wireless control unit 122 is notified by the wireless unit 130 of completion of transmission, the wireless control unit 122 acquires a time T2 indicated by the clock 124. The wireless control unit 122 stores the acquired time as a transmission time at which transmission of the timing information performed by the wireless unit 130 is completed. The wireless control unit 122 instructs the wireless unit 130 to transmit time information including information indicating the transmission time (step S105). The wireless unit 130 transmits the time information after the transmission right has been acquired according to carrier sensing (step S106).

In the terminal station 20b, when the wireless unit 210 receives the timing information (SYNC) transmitted from the wireless base station 10b, the wireless unit 210 detects a synchronization code word. The wireless unit 210 notifies the wireless control unit 220 that the synchronization code word has been detected (step S201). When the wireless control unit 220 receives notification of detection of the synchronization code word, the wireless control unit 220 acquires a time T'6 indicated by the clock 223 as a reference time and stores the acquired time T'6. That is, the wireless control unit 220 determines the time at which the synchronization code word is detected as a time at which the timing information is received and stores the time T'6.

When the wireless unit 210 completes signal processing for the signal of the received tuning information, the wireless unit 210 notifies the wireless control unit 220 of completion of signal processing (step S202). For example, the signal processing includes processes such as a process performed on a PHR header included in the signal of the timing information, demodulation of data included in a payload, and error detection using a cyclic redundancy check (CRC). The wireless unit 210 receives the time information from the wireless base station 10b and acquires a transmission time T2 from the time information. The wireless unit 210 notifies the wireless control unit 220 of the transmission time T2 (step S203). The wireless control unit 220 corrects the clock 223 when the transmission time T2 is acquired.

The correction unit 221 of the wireless control unit 220 corrects the clock 223 on the basis of the stored reference time T'6, the notified transmission time T2, and the frame length of the timing information. The correction unit 221 uses the frame length of the timing information to calculate a time t6 required to receive the timing information. The time t6 required to transmit the timing information is a period of time from when the wireless unit 210 starts reception of the tuning information to when the wireless unit 210 completes reception of the timing information. The time t6 may be regarded as a transmission period of timing information. Since a transmission rate used for wireless communication between the wireless base station 10b and the terminal station 20b is predetermined, the correction unit 221 is able to calculate the time t6 from the frame length of the timing information and the transmission rate. The correction unit 221 may calculate the time t6 using the quantity of data of the timing information instead of the frame length of the timing information.

The correction unit 221 estimates the time (T6=T'6+t6) indicated by the clock 223 at a time when the wireless base station 10b completes transmission of the tuning information on the basis of the time T'6 and the time t6 by setting a transmission time in a transmission section from the wireless base station 10b to the terminal station 20b to almost zero. The correction unit 221 corrects the clock 223 using a difference (T6−T2) between the transmission time T2 and the time T6 as a correction quantity.

In the third embodiment, the wireless control unit 220 may also apply time correction based on the elapsed time Δt elapsed until the transmission time is acquired from the wireless base station 10b illustrated in FIG. 3 or FIG. 4. That is, the correction unit 221 may correct the clock 223 on the basis of the difference T6−T2 and a deviation in time in the elapsed time Δt. The deviation in time in the elapsed time Δt is a deviation in time occurred between the clock 124 and the clock 223 in the elapsed time Δt from the time T6 to acquisition of the time information.

A time required for the wireless unit 210 to complete signal processing for the signal of the timing information may vary according to a processing speed and a processing load of the wireless unit 210. In the third embodiment, the wireless unit 210 notifies the wireless control unit 220 of detection of the synchronization code word such that the wireless control unit 220 is able to acquire the timing at which reception of the timing information starts. Detection of the synchronization code word is hardly affected by the processing speed and processing load of the wireless unit 210. Accordingly, the correction unit 221 is able to acquire the time of the clock 223 at which the wireless base station 10b completes transmission of the timing information by using the time T'6 at which the synchronization code word is detected and the time t6 required to transmit the timing information.

The terminal station 20b in the third embodiment is able to synchronize the clock 223 with the clock 124 by suppressing the influence of a delay caused by autonomous waiting before transmission in the MAC layer and a delay occurring according to a reception process.

Fourth Embodiment

A time synchronization system according to a fourth embodiment is included in a wireless communication system in the same way as in the first, second and third embodiments. The fourth embodiment differs from the third embodiment with respect to a procedure of estimating a time indicated by the clock 223 at a time when transmission of timing information is completed in a wireless base station.

Figure 7:
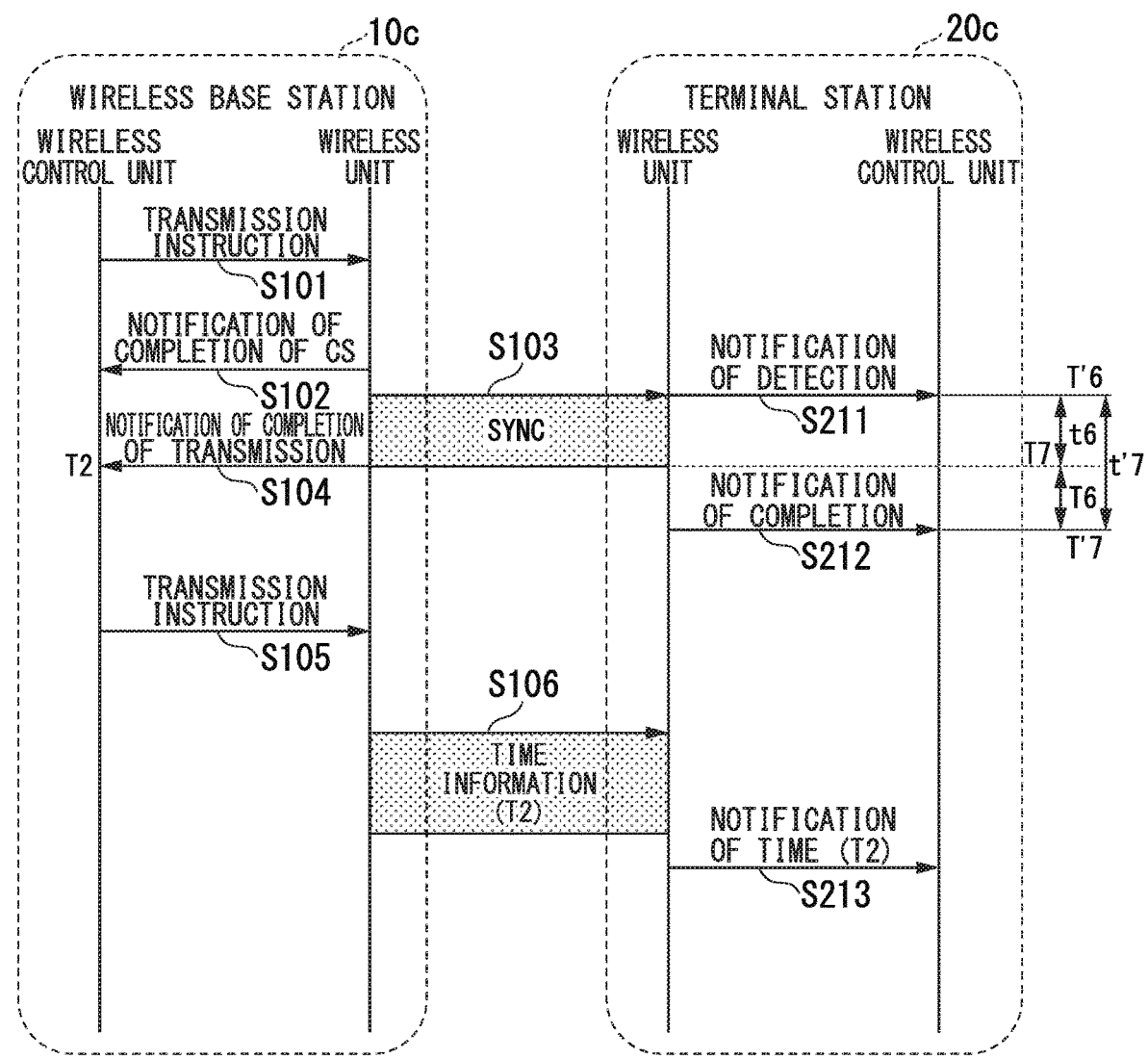
FIG. 7 is a sequence diagram showing an operation of a time synchronization system of a fourth embodiment.

FIG. 7 is a sequence diagram showing an operation of the time synchronization system of the fourth embodiment. The figure illustrates a case in which the wireless device 100 is a wireless base station 10c and the wireless device 200 is a terminal station 20c. The operation of the wireless base station 10c in a time synchronization method of the fourth embodiment is the same as the operation (steps S101 to S105) of the wireless base station 10b of the third embodiment and thus redundant description is omitted.

The operation of the terminal station 20c in the time synchronization method of the fourth embodiment will be described with reference to FIG. 7. In the terminal station 20c, when the wireless unit 210 receives timing information (SYNC) transmitted from the wireless base station 10c, the wireless unit 210 detects a synchronization code word. The wireless unit 210 notifies the wireless control unit 220 of detection of the synchronization code word (step S211). When the notification of detection of the synchronization code word is received, the wireless control unit 220 acquires a time T'6 indicated by the clock 223 and stores the acquired time T'6.

When the wireless unit 210 completes signal processing for the signal of the received timing information, the wireless unit 210 notifies the wireless control unit 220 of completion of signal processing (step S212). When the notification of completion of signal processing is received, the wireless control unit 220 acquires a time T'7 indicated by the clock 223 as the completion time and stores the acquired time T'7. The wireless unit 210 receives time information from the wireless base station 10c and acquires a transmission time T2 from the time information. The wireless unit 210 notifies the wireless control unit 220 of the transmission time T2 (step S213). The wireless control unit 220 corrects the clock 223 when the transmission time T2 is acquired.

The correction unit 221 corrects the clock 223 on the basis of the stored time T'6 and time T7, the notified transmission time T2 and the frame length of the timing information. The correction unit 221 calculates a time t6 required to receive the timing information from the frame length of the timing information and a transmission rate used for wireless communication between the wireless base station 10c and the terminal station 20c. The correction unit 221 calculates a time t'7 from the time T'6 to the time T'7. The correction unit 221 calculates a time (t7=t'7−t6) required for the wireless unit 210 to perform signal processing on the signal including the timing information from the calculated time t'7 and the time t6. For example, the signal processing includes processes such as a process performed on a PHR header included in the signal of the timing information, demodulation of data included in a payload and error detection using a CRC.

The correction unit 221 estimates the time (T7=T'7−t7) indicated by the clock 223 at a time when the wireless base station 10c completes transmission of the timing information on the basis of the time T'7 and the time t7 by setting a transmission time in a transmission section from the wireless base station 10c to the terminal station 20c to almost zero. The correction unit 221 corrects the clock 223 using a difference (T7−T2) between the transmission time T2 and the time T7 as a correction quantity.

In the fourth embodiment, the correction unit 221 may also apply time correction based on the elapsed time Δt elapsed until the transmission time is acquired from the wireless base station 10c illustrated in FIG. 3 or FIG. 4. That is, the correction unit 221 may correct the clock 223 on the basis of the difference (T7−T2) and a deviation in time between the clock 124 and the clock 223 occurred in the elapsed time Δt from the time T7 to acquisition of the time information. The correction unit 221 may measure the elapsed time Δt using the time T'7 as the origin.

In the terminal station 20c of the fourth embodiment, the wireless unit 210 notifies the wireless control unit 220 of completion of signal processing for the timing information. The correction unit 221 of the wireless control unit 220 calculates a time t7 required for the wireless unit 210 to perform signal processing on the signal including the timing information on the basis of the reference time T'6, the time t6 required to receive the timing information, and completion time which is the time T'7 indicated by the clock 223 when completion of the signal processing is notified of. The correction unit 221 corrects the clock 223 on the basis of the calculated time t7 and the completion time T'7. According to the above-described operation, the terminal station 20c in the fourth embodiment is able to synchronize the clock 223 with the clock 124 by suppressing the influence of a delay caused by autonomous waiting before transmission in the MAC layer and a delay occurring according to a reception process.

According to the above-described embodiments, the time synchronization system separates timing information which is information about a timing from time information which is information about time synchronization and separately transmits the time information and the timing information. Accordingly, it is possible to accomplish time synchronization with high accuracy (about several tens of μ seconds) between wireless devices or between modules in a wireless device without a unique hardware configuration.

Specifically, a wireless line is used for transmission of timing information between wireless devices and a versatile high-speed line such as a pulse line is used for transmission of timing information between modules in a wireless device.

A wireless device (or module) transmits timing information to another wireless device (or module) and acquires a transmission time of the timing information from a clock of the wireless device (or module). In addition, the wireless device (or module) transmits time information in which the acquired time has been set to the other wireless device (or module) after transmission of the timing information. Accordingly, uncertainty with respect to the time for communication is avoided.

Alternatively, information representing that timing information is information indicating a timing of zero-second (also including each zero-millisecond and the like) related to time information is defined in advance between modules. The time information indicates a time in a larger unit than a timing (second) indicated by the timing information and thus it is possible to ignore variation in time with respect to processing of the time information.

According to the above-described embodiments, it is possible to achieve high (about several tens of microseconds) synchronization accuracy with versatility at low cost without a unique hardware configuration in promoting time synchronization between devices or modules which perform wireless communication.

Although the embodiments of the present invention have been described in detail with reference to the drawings, specific configurations are not limited to the embodiments and may include designs and the like in a range which does not depart from essential characteristics of the invention.

INDUSTRIAL APPLICABILITY

The present invention is applicable to time synchronization between devices or modules.

Reference Signs List

1 Time synchronization system
10, 10a Wireless base station
20, 20a Terminal station
100, 200 Wireless device
110 GPS unit
120 Control unit
121 GPS control unit
122, 220 Wireless control unit
123, 221, 231 Correction unit
124, 223, 232 Clock
130, 210 Wireless unit
141, 142, 242 Pulse line
151, 152, 251, 252 Serial line
222 History-recording unit
230 Sensor control unit
240 Sensor unit

The invention claimed is:

1. A wireless communication system comprising:
a first wireless device; and
a second wireless device,
wherein the first wireless device comprises:
  a first clock; and
  a wireless transmitter configured to wirelessly transmit timing information and time information separately, the time information being acquired from the first clock and indicating a transmission time when a transmission of the timing information is completed, and the timing information having a fixed frame length, and
wherein the second wireless device comprises:
  a second clock;
  a wireless receiver configured to receive the wirelessly transmitted timing information and time information separately; and
  a correction processor configured to:
store a reference time indicated by the second clock at a time when the wireless receiver detected synchronization of a radio frame relating to the timing information;
calculate, from the fixed frame length of the timing information and a transmission rate used for wireless communication between the first wireless device and the second wireless device, a time required to receive the timing information; and
correct the second clock using a difference between a elapsed time indicating a time when the time required to receive the timing information has elapsed from the reference time and the transmission time indicated by the time information as a correction quantity.

2. The wireless communication system according to claim 1, wherein the correction processor configured to:
store a completion time indicating a time when the second wireless device has completed signal processing of the timing information;
calculate a time required to complete the signal processing by subtracting the time required to receive the timing information from a difference between the reference time and the completion time; and
corrects the second clock using a difference between a time acquired by subtracting the time required to complete the signal processing from the completion time and the transmission time.

3. The wireless communication system according to claim 1,
wherein the second wireless device further comprises:
  a storage configured to record history information about correction of the time of the second clock, and
wherein the correction processor calculates a trend in a deviation in the time of the second clock on a basis of the history information and corrects a deviation in the time of the second clock in an elapsed time on a basis of the calculated trend and the elapsed time from reception of the timing information to reception of the time information.

4. The wireless communication system according to claim 3,
wherein the history information includes information on a time when correction of the time of the second clock was performed, and
wherein the correction processor corrects the deviation in the time of the second clock in the elapsed time on a basis of a period from previous correction of the second clock to a next correction of the second clock and the elapsed time from reception of the timing information to reception of the time information.

5. The wireless communication system according to claim 3,
wherein the history information includes information on a time when time correction of the second clock was performed and a correction quantity of the second clock at the time, and
wherein the correction processor calculates a deviation of the second clock in a certain time on a basis of a period from a time correction to a next time correction and the correction quantity, and corrects a deviation in the time of the second clock in the elapsed time on a basis of the calculated deviation in the certain time and the elapsed time from reception of the timing information to reception of the time information.

6. The wireless communication system according to claim 1, wherein the correction processor is further configured to correct the second clock on a basis of a difference in time between the transmission time and a sum of the reference time and the time required to receive the timing information.

7. The wireless communication system according to claim 1,
wherein the wireless receiver is further configured to notify the correction processor of completion of signal processing for receiving the timing information,
wherein the correction processor is further configured to acquire a completion time indicating by the second clock when receiving a notification of completion of the signal processing,
wherein the correction processor is further configured to calculate a time required for the signal processing by subtracting the time required to receive the timing information from a difference in time between the reference time and the completion time, and
wherein the correction processor is further configured to correct the second clock using a difference in time between the transmission time and a time obtained by subtracting the time required for the signal processing from the completion time.

8. A wireless terminal in a wireless communication system including a wireless base station and the wireless terminal, the wireless terminal comprising:
   a wireless receiver configured to separately receive timing information having a fixed frame length and transmitted from the wireless base station and time information indicating a transmission time indicated by a first clock included in the wireless base station at a time when the wireless base station completes transmitting the timing information;
   a second clock; and
   a correction processor configured to:
   store a reference time indicated by the second clock at a time when the wireless receiver detected synchronization of a radio frame relating to the timing information;
   calculate, from the fixed frame length of the timing information and a transmission rate used for wireless communication between the wireless base station and the wireless terminal, a time required to receive the timing information and
   correct the second clock using a difference between a elapsed time indicating a time when the time required to receive the timing information has elapsed from the reference time and the transmission time indicated by the time information as a correction quantity.

9. A time synchronization method executed by a wireless communication system including a first wireless device and a second wireless device, the time synchronization method comprising:
   a transmission step in which the first wireless device wirelessly transmits timing information and time information separately, the time information being acquired from a first clock included in the first wireless device and indicating a transmission time when a transmission of the timing information is completed, and the timing information having a fixed frame length;
   a reception step in which the second wireless device receives the wirelessly transmitted timing information and time information separately;
   a storing step in which the second wireless device stores a reference time indicated by the second clock at a time when the wireless receiver detected synchronization of a radio frame relating to the timing information;
   a calculation step in which the second wireless device calculates, from the fixed frame length of the timing information and a transmission rate used for wireless communication between the first wireless device and the second wireless device, a time required to receive the timing information; and
   a correction step in which the second wireless device corrects the second clock using a difference between a elapsed time indicating a time when the time required to receive the timing information has elapsed from the reference time and the transmission time indicated by the time information as a correction quantity.

10. The time synchronization method according to claim 9, wherein:
    the second wireless device stores a completion time indicating a time when the second wireless device has completed signal processing of the timing information in the storing step;
    the second wireless device calculates a time required to complete the signal processing by subtracting the time required to receive the timing information from a difference between the reference time and the completion time in the calculation step; and
    the second wireless device corrects the second clock using a difference between a time acquired by subtracting the time required to complete the signal processing from the completion time and the transmission time in the correction step.

11. The time synchronization method according to claim 9, further comprising:
    a recording step in which the second wireless device records history information about correction of the time of the second clock,
    wherein a trend in a deviation in the time of the second clock is calculated on a basis of the history information, and
    wherein the deviation in the time of the second clock in an elapsed time is further corrected on a basis of the calculated trend and the elapsed time from reception of the timing information to reception of the time information in the correction step.

12. The time synchronization method according to claim 11,
    wherein the history information includes information on a time when correction of the time of the second clock was performed, and
    wherein, in the correction step, the deviation in the time of the second clock in the elapsed time is corrected on a basis of a period from a previous correction of the second clock to a next correction of the second clock, and the elapsed time from reception of the timing information to reception of the time information.

13. The wireless communication method according to claim 11,
    wherein the history information includes information on a time when time correction of the second clock was performed and a correction quantity of the second clock at the time,
    wherein, in the correction step, a deviation of the second clock in a certain period of time is calculated on a basis of a period from a time correction to a next time correction and the correction quantity, and
    wherein the deviation in the time of the second clock in the elapsed time is corrected on a basis of the calculated deviation in the certain period of time, and the elapsed time from reception of the timing information to reception of the time information.

* * * * *